No. 745,539. PATENTED DEC. 1, 1903.
C. WALES.
ADDING MACHINE.
APPLICATION FILED SEPT. 12, 1902.
NO MODEL. 7 SHEETS—SHEET 1.

WITNESSES:

INVENTOR
Charles Wales
BY William R. Baird
His ATTORNEY

No. 745,539. PATENTED DEC. 1, 1903.
C. WALES.
ADDING MACHINE.
APPLICATION FILED SEPT. 12, 1902.
NO MODEL. 7 SHEETS—SHEET 2.

Fig. 2.

WITNESSES:
S. J. Cox
S. S. Newton

INVENTOR
Charles Wales
BY William R. Baird
His ATTORNEY

No. 745,539. PATENTED DEC. 1, 1903.
C. WALES.
ADDING MACHINE.
APPLICATION FILED SEPT. 12, 1902.
NO MODEL. 7 SHEETS—SHEET 3.

WITNESSES:

INVENTOR
Charles Wales
BY William R. Baird
ATTORNEY

No. 745,539. PATENTED DEC. 1, 1903.
C. WALES.
ADDING MACHINE.
APPLICATION FILED SEPT. 12, 1902.
NO MODEL. 7 SHEETS—SHEET 4.

Fig. 5.

WITNESSES:

INVENTOR
Charles Wales
BY William R. Baird
His ATTORNEY

No. 745,539. PATENTED DEC. 1, 1903.
C. WALES.
ADDING MACHINE.
APPLICATION FILED SEPT. 12, 1902.
NO MODEL. 7 SHEETS—SHEET 5.

Fig. 7.

WITNESSES:
S. J. Cop
S. S. Newton

INVENTOR
Charles Wales
BY William R. Baird
His ATTORNEY

No. 745,539. PATENTED DEC. 1, 1903.
C. WALES.
ADDING MACHINE.
APPLICATION FILED SEPT. 12, 1902.
NO MODEL. 7 SHEETS—SHEET 6.

WITNESSES:
S. J. Cox
B. B. Newton

INVENTOR
Charles Wales
BY William R. Baird
His ATTORNEY

No. 745,539. PATENTED DEC. 1, 1903.
C. WALES.
ADDING MACHINE.
APPLICATION FILED SEPT. 12, 1902.
NO MODEL. 7 SHEETS—SHEET 7.

WITNESSES:
S. J. Cox
E. B. Newton

INVENTOR
Charles Wales
BY William R. Baird
His ATTORNEY

THE NORRIS PETERS CO., PHOTO-LITHO., WASHINGTON, D. C.

No. 745,539.

Patented December 1, 1903.

UNITED STATES PATENT OFFICE.

CHARLES WALES, OF DETROIT, MICHIGAN.

ADDING-MACHINE.

SPECIFICATION forming part of Letters Patent No. 745,539, dated December 1, 1903.

Application filed September 12, 1902. Serial No. 123,133. (No model.)

*To all whom it may concern:*

Be it known that I, CHARLES WALES, a citizen of the United States, and a resident of Detroit, in the county of Wayne and State of Michigan, have invented certain new and useful Improvements in Adding-Machines, of which the following is a specification.

My invention relates to adding-machines adapted to be operated by keys bearing numerals and provided with a sight-register for displaying the result of the calculations.

The objects of the invention, among others, are to produce a device of simple and compact structure having its parts designed to insure strength and durability; to reduce the number of parts usually employed in the construction of the same and secure uniformity in their shape and proportions, thereby insuring accuracy of adjustment and reducing the amount of manual labor involved in making and assembling the same; to substitute in many instances positive mechanical movements and a single means for performing a given movement or movements for uncertain or inexact movements and a plurality of means.

It also has for a general object an improvement in the speed and simplicity as well as in the accuracy of this class of machines.

The invention is illustrated in the accompanying drawings, in which—

Fig. 18 is an enlarged side view. Fig. 19 an edge view, and Fig. 20 a reverse side view, of the pinion-sectors and pawl of the same wheel. Fig. 21 is an enlarged detail of the bearing-block in perspective. Fig. 22 is an enlarged detail in perspective of the zero-setting rake. Fig. 23 is a longitudinal section of one of the plates supporting the key-lever bearings and parts supported thereby.

Before entering upon a particular description of the parts of the machine illustrated in the drawings I will outline its general characteristics in order that the relation of the parts to each other and to the whole may be clearly understood as the specification proceeds.

The machine has a keyboard and key-levers which will remain in either one of their two positions until moved therefrom by an impulse received from the operator through the keys or other parts of the machine. These levers operate a series of stops and interpose them into the path of the racks which determine the rotation of the numeral-wheels, the position of the particular stop thus interposed determining the extent of the wheel's rotation and consequently the particular numeral on the periphery of the wheel in view when the rotation is checked. The numeral on the key corresponds to the number displayed when the wheel comes to a standstill. A stop-and-release plate is employed which holds the racks until the number desired to be added has been written on the keyboard. The racks are returned to their original positions through the action of a main operating-lever, which simultaneously rotates the numeral-wheels communicating with the racks which have been displaced. The wheels are returned to zero by means of a "rake,"

which has a rotary motion parallel to the wheels and which engages pins thereon. These pins also serve to set the carrying mechanism, which when one wheel passes the numeral 9 causes the next wheel to be moved one step or number. A series of correcting-keys are also provided for the purpose of replacing keys which may have been erroneously struck in setting the number. A key is also provided which operates upon the means for returning the setting mechanism to its normal position, thus allowing the operator to repeat or multiply a given number without resetting it.

Most of the working parts of the machine are held at rest by springs which immediately return them to their normal positions after each operation.

The frame of the machine is supported upon a rectangular base-plate 25, having studs 24 at its corners to hold in position a suitable casing 23. Uprights 26 on either side are provided with forward arms 27 and backward arms 28 at their upper parts, the former being connected to the center of the upright by a brace 29, which connects with a short arm 30. Another short arm 31 extends backward from the upright opposite the arm 30. These parts are preferably made integral and stamped out of one piece of metal. The duplicate sides of the frame thus constructed are connected by a series of horizontal bars, including those designated by the reference-numbers 33 to 41, inclusive, running through the machine and fixed at their ends to the said pieces of the frame.

Posts 32, one at each side of the base-plate, at the forward part thereof, have a shaft 42 rotatably mounted thereon, and to this shaft an operating-crank 50 and two short arms 51 are keyed. The crank 50 is provided with an ordinary handle 52, Fig. 1, by which it is drawn forward to operate the machine. It is restricted in its forward movement by a stop 53 and is held normally in its backward position against a stop 54 by a tension-spring 55, connected to the right arm 51 through a link 56. The crank in its oscillations describes an arc slightly less than ninety degrees, and the manner in which the machine is operated through these oscillations will be hereinafter described.

The keyboard, levers, and stops are made separable from the other parts of the machine and may be removed from the machine and replaced without disturbing the same in any way. The construction by which this end is accomplished consists of a series of plates 60, Fig. 2, one for each row of keys, and levers which are mounted thereon. The plates 60 are in turn hung from the top inclined cover 44 by means of brackets 45, fixed to said cover. This cover 44 rests its upper edge on the arms 27 at either side and is joined to a front end piece 46, which supports it at its lower end. The cover also has suitable perforations for key-rods 68. The upper ends of the stop-bars 67 pass through slots in a plate 47, having a thickened portion 49 supported from the cover by brackets 48 at each side. The top cover therefore carries with it the entire set of keys, key-levers, and stops.

The plates 60 have strips of elastic material 61 (see Fig. 23) on each side. Spring-pieces 65 with mortised edges through which the key-levers 63 pass are located one on each side of lever-pivots 62. These spring-pieces have pointed ends 66, which are in contact with the elastic strips 61, so that when the levers are moved they will remain in position until moved again. The lever-pivots 62 pass through the springs, levers, elastic strips, and plates and are secured in position by wires 64, which pass through their ends, a single wire serving to secure an entire set or row of pivots. As wires of considerable stiffness are used, they serve to assist in maintaining the alinement of the parts.

Each key-lever 63 has a vertical stop-rod 67 on its inner end, the rods connected with each row of keys and levers being alined in substantially the same plane therewith. As the key-levers are arranged in parallel pairs, the ends of the stop-rods 67 attached at one end and of the key-rods 68 attached at the opposite end are bent slightly near the points of attachment to secure perfect alinement of their upper ends with these rods. The levers 63 also are made of unequal length to secure the proper spacing of the rods and keys. The stop-rods 67 are of graduated lengths, so that their upper ends will be normally in the same plane, and upon them resetting-dogs 70 impinge. One of these dogs 70 is provided for each row of stops and serves the double purpose of checking the movement of the rack to which it is opposed and of returning the displaced stop and key to their original positions after an operation or when acted upon by the resetting mechanism.

Figure 1:
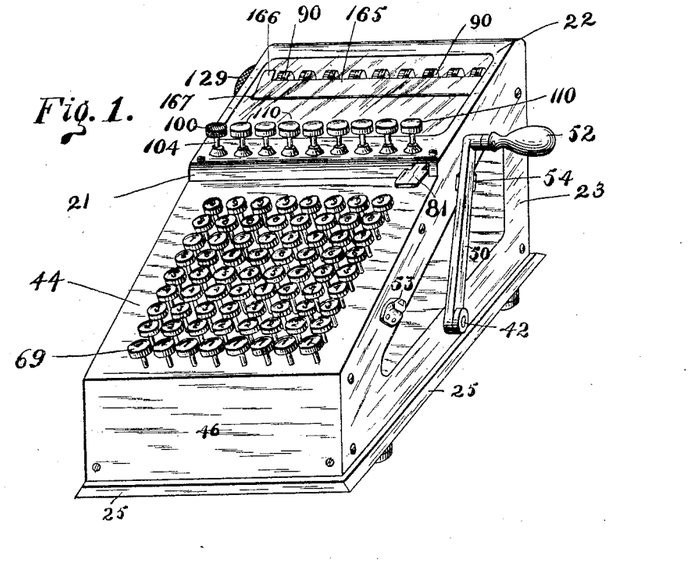
Figure 1 is an exterior perspective view of an adding-machine embodying my invention.
Figure 2:
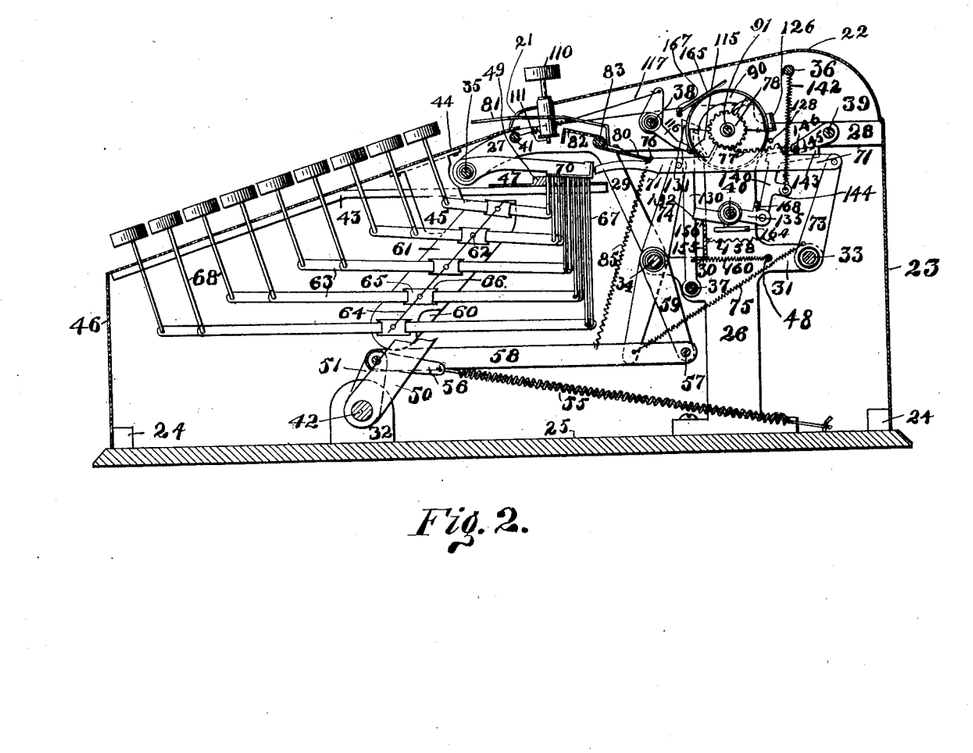
Fig. 2 is a side elevation of a train of mechanism for one section of the machine and some of the adjacent parts with certain portions broken away.
Figure 3:
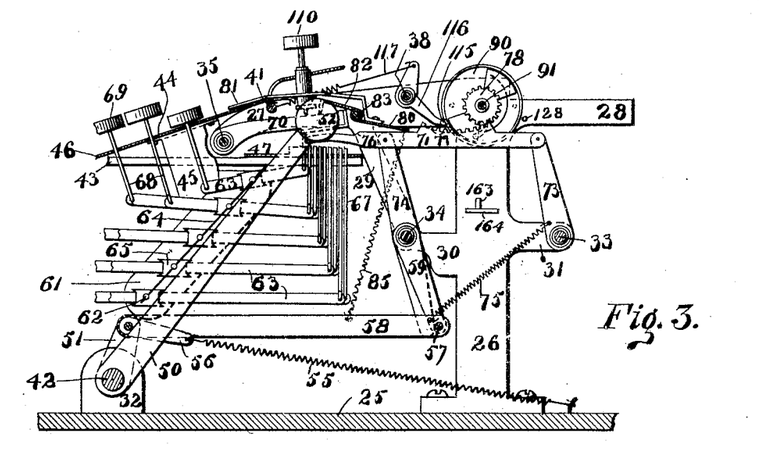
Fig. 3 is a similar view showing a different position of the operating parts.
Figure 4:
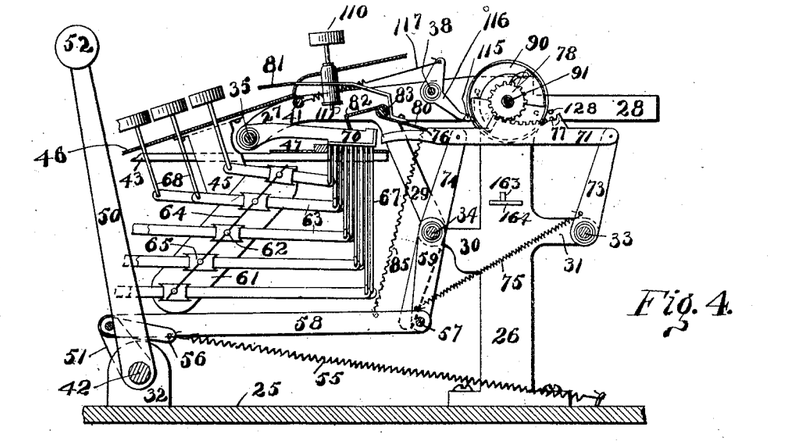
Fig. 4 is a like view showing still another position.

Reciprocating rack-bars 71, Figs. 2, 3, and 4, are supported upon the upper ends of rocking arms 73 and levers 74, which are mounted upon the horizontal bars 33 and 34, respectively. A tension-spring 75 is secured to the arm 73 above its pivot and to the lever 74 below its pivot, so that the said spring 75 has a tendency to throw the upper ends of said parts and the rack-bar itself forward. Each rack-bar 71 is held in its backward position by a release-plate 80, which engages a notch 76 in the upper edge thereof. Its forward movement is still further restrained by the dog 70, which lies normally in its path. The plate 80 rocks upon a bar 83, mounted in the side frames, and has an arm 81 extending from one end through a lip 21, Figs. 1 and 2, which forms the rear end of the front section 22 of the cover, by pressing which arm the plate may be released from engagement with the rack-bars. A resetting-plate 82, extending in the opposite direction, is also mounted on the bar 83.

The rack-bars 71 are provided with racks 77, which are constantly in mesh with pinions 78, which are rotatably mounted on the wheel-shaft 91. These racks are curved to compensate for the digression of the rack-bar 71 from the horizontal in its movements, the curve being the reverse of the arc described by the arm 73 and lever 74.

The pinions 78 move independently of the numeral-wheels 90 and carry with them sectors 79. A pawl 88 with a spring 89 is mounted upon each sector. The numeral-wheels 90, with their respective pinions, are separated and held in their longitudinal positions on the shaft 91 by small collars 92.

Each one of the wheels 90 has a ratchet 93 fixed thereto, which is engaged by the pawl 88, so that when the pinion 78 and its pawl 88 are rotated by the backward movement of the rack 77 the pawl will engage the ratchet 93 and rotate it in proportion to the extent of the backward movement of the rack, which movement is equal to its forward movement as determined by the particular stop interposed into its path. The backward movement of the racks is accomplished by the forward movement of the operating-crank 50 and arm 51, Figs. 3 and 4, which draws forward the rods 58, secured to said arms and the cross-bar 57, extending across the machine and secured at its ends to the rear ends of the rods 58. As the bar 57 moves forward it will carry with it any of the lower ends of the levers 74 which may be back of their normal positions. It will be seen that this movement of the levers 74 causes the backward movement of the racks 77 and the consequent rotation of the wheels 90. The rod 57 is supported by swinging arms 59, depending from the bar 34, and is returned to its original position after a forward movement by the retraction of the spring 55.

Figure 7:
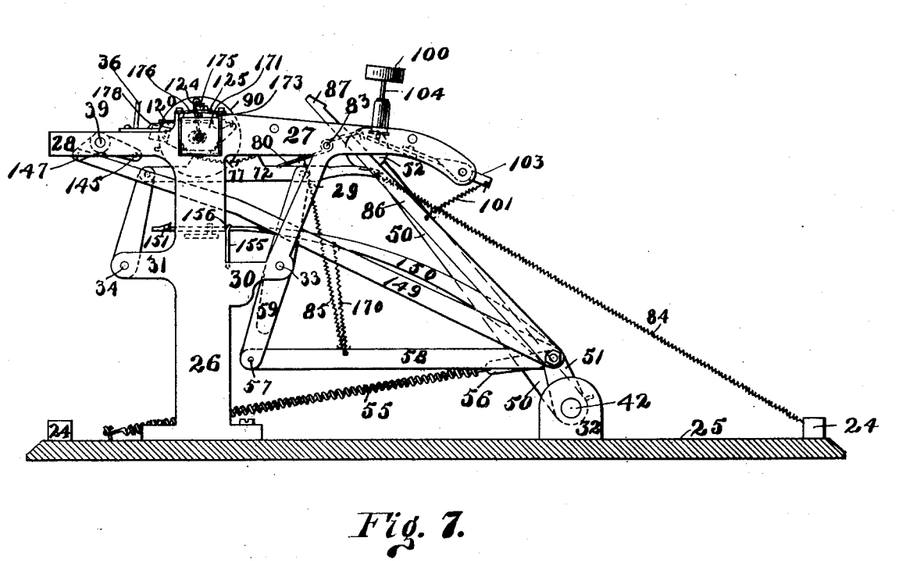
Fig. 7 is an elevation of certain parts, taken from the side opposite Fig. 2.
Figure 8:
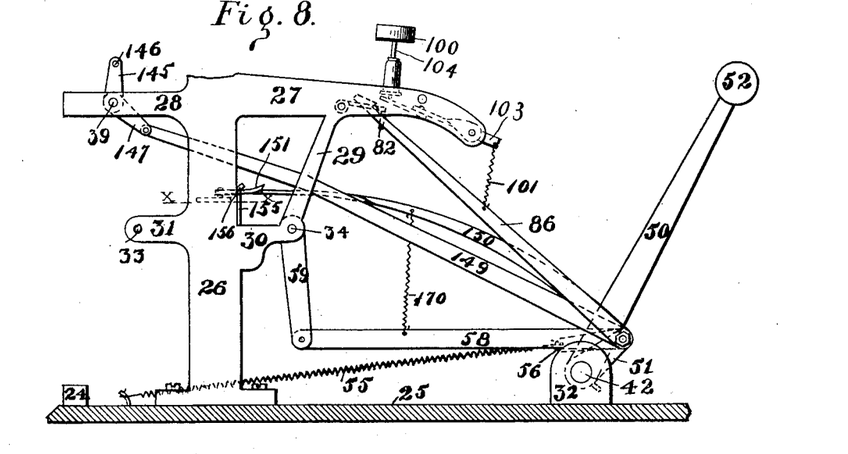
Fig. 8 is a view similar to Fig. 7, showing a different position of the parts.
Figures 9, 10:
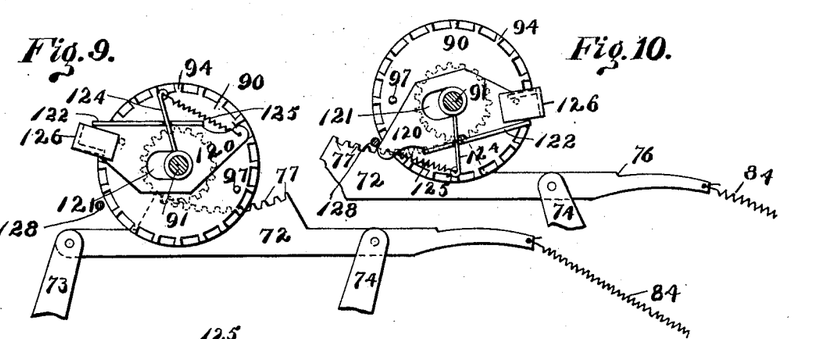
Figs. 9, 10, and 11 are enlarged detail end views of the zero-setting mechanism, showing different positions, the thumb-wheel being cut off to expose the other parts.
Figures 11, 24:
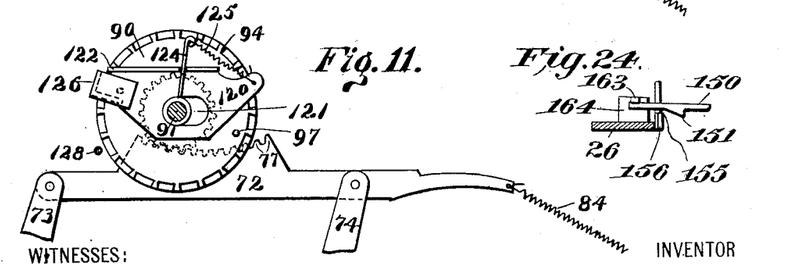
Fig. 24 is a detail sectional view on the plane indicated by the broken line $xx$ of Fig. 8 looking downward.
Figure 12:
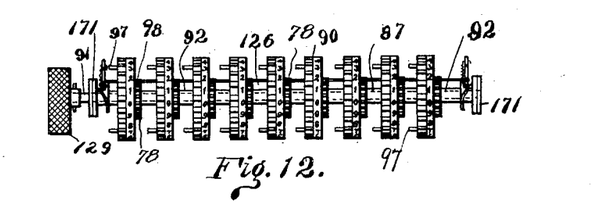
Fig. 12 is a detail front view of the numeral-bearing wheels and shaft, showing also the end portions of the zero-setting mechanism.
Figure 13:
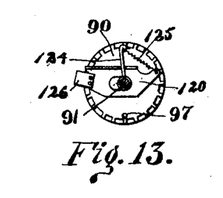
Fig. 13 is an end view of the same with the thumb-wheel and bearing-block cut off.
Figure 14:
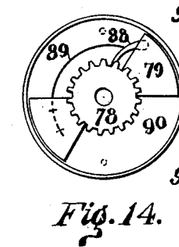
Fig. 14 is an enlarged side view, and Fig. 15 an edge detail view, of one of the numeral-wheels detached.
Figure 15:
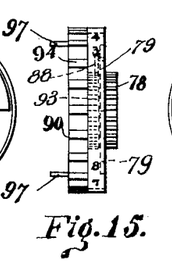
Figure 16:
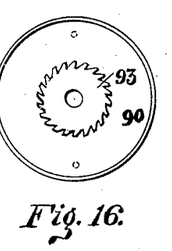
Fig. 16 is a side view, and Fig. 17 a reverse side view, of the same wheel with the pinion-sectors and pawl removed.
Figure 17:
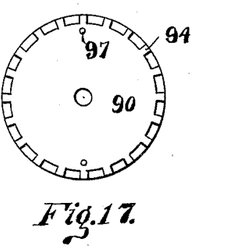

The key-resetting mechanism, Fig. 7, comprises a rod 86, provided with a hook 87, which extends from one of the arms 51 through the plate 82. It will appear that as the arm 51 moves forward the hook 87 will engage the plate 82 and cause the latter to press the dogs 70 down upon the upper ends of the stop-rods 67 until the dogs are brought into contact with the thickened portion 49 of the plate 47, and thus return the rods 67 to their normal positions. The plate 82 is returned to its position by a tension-spring 101, which forces the upper part of the rod 86 against it.

Figure 5:
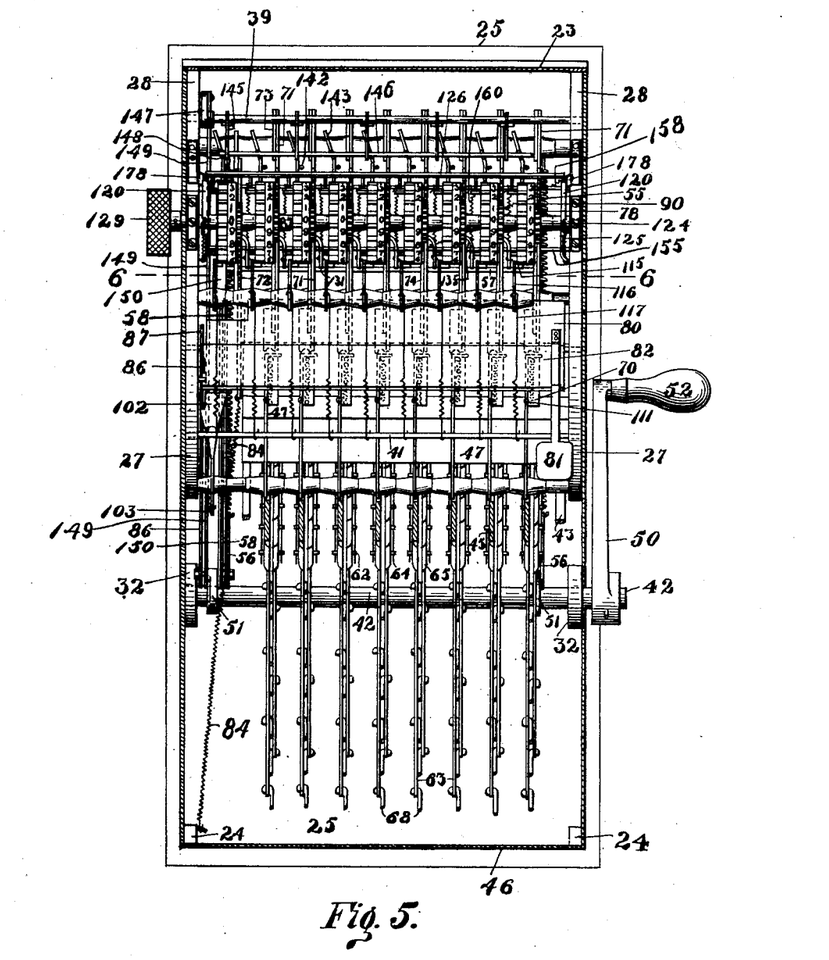
Fig. 5 is a plan view of the machine with the upper part of the casing and some of the upper parts cut away.
Figure 6:
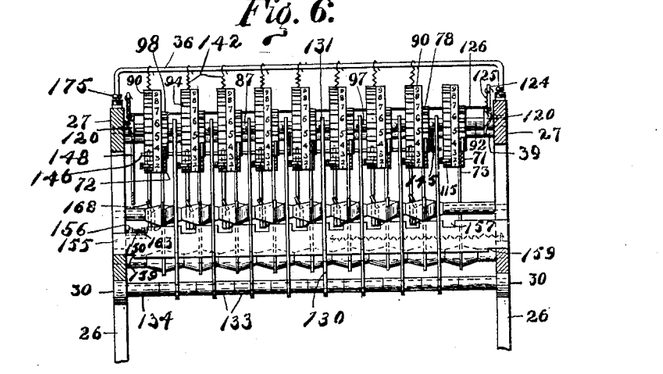
Fig. 6 is a front view of the parts back of the plane of the line 6 6 above the bar 30 of Fig. 5.

The multiplying device comprises a multiplying-key 100, its rod 104, a rocking plate 102, Figs. 5 and 7, pivoted to one of the arms 27, and the spring 101, which is attached to an extension 103 of the rocking plate 102, and holds the opposite end of said rocking plate in its upper position in contact with the key-rod 104. When the plate 102 is depressed by the key 100, it presses the rod 86 backward and causes the hook 87 on its upper end to escape the resetting-plate 82. When, therefore, this key 100 is held down, the numeral-keys 69 remain set, and each movement of the operating-crank 50 adds the original sum set to the sum already registered.

Correcting-keys 110, Fig. 1, mounted in the top plate 22 of the casing of the machine, are provided for each longitudinal row of numeral-keys and stops. The rods 111 of the keys 110 impinge upon the dogs 70, Fig. 2, when depressed and will return any stop-bar 67 in its respective row which may have been moved to its normal position without affecting any of the other rows of bars. In this manner when a key is erroneously struck it may be easily replaced by striking the correcting-key at the head of its row.

A series of friction-wheels 115, Figs. 2 to 6, one for each of the numeral-wheels 90, mounted upon the lower ends of small levers 116, Fig. 3, which in turn are pivotally mounted on the bar 38, are held in contact with teeth 94 on the periphery of the wheels 90 by tension-springs 117, secured to a bar 41. These wheels enter between the teeth 94 as the wheels 90 rotate and check the rotation of the latter when the impulse from the moving mechanism is withdrawn.

The zero mechanism, Figs. 5 to 11, comprises two plates 120, one located on each end of the shaft 91. These plates have elliptical slots 121, the focal diameters of which are horizontal, and through these slots the shaft 91 passes. Radial pins 124 are secured one to each end of the shaft 91 and extend through small recesses 123 in flanges 122 on the upper edge of the plate 120. The free ends of the pin 124 are each connected with the forward part of the plates 120 by tension-springs 125. A rake consisting of a finger-bar 126 and fingers 127 extends from the rear edge of one plate 120 to that of the other similar plate 120 and is normally removed a sufficient distance from the wheels to allow the pins 97, which project laterally in pairs from the wheels 90, to escape the fingers 127. These pins 97 are diametrically opposite each other, being in juxtaposition to the five marks on the periphery of the wheel, as shown in the drawings. The rake is operated by means of a finger-wheel 129, which is keyed to one end of the shaft 91 and rotates it within the collars 92 and the wheels 90, mounted thereon. When the shaft 91 starts its rotation, the radial pins 124 engaging the recess 123 of the flange 122 will first throw the plate 120 forward until the shaft has passed to the opposite or rear end of the slots 121, the plate maintaining the same horizontal position. This movement brings the fingers 127 within the radius of the pins 97. The further rotation of the shaft will then cause the rake to pass over the numeral-wheels, but the fingers projecting between them will carry with them any of the pins 97 which are out of their normal positions, rotating the respective wheels to which they belong until the zero-marks are alined on a rule 165, hinged on a transverse bar 167, when the forward rotation of the rake is checked by contact of the plate 120 with the pins 128, Figs. 9, 10, and 11, projecting inwardly from the frame of the machine. The rake is then returned to its original position, its flanges 122 resting upon stops 178, secured to the frame of the machine. This return is accomplished by a rack on a bar 72, mounted between the eighth and ninth wheels and engaging one of the pinions 78, (designated as 98,) which is fixed to the shaft 91. This rack-bar 72 is the same in size and shape as the rack-bars 71, and the pinion 98 is similar in construction to the other pinions 78, but is fixed to the shaft 91. The rack-bar 72 is held normally in its forward position by a spring 84, stretched from its forward end to one of the studs 24.

The rule 165, hinged on the transverse bar 167, has upturned portions 166, by means of which the finger-bar 126 raises the rule when it is rotated and comes in contact therewith, thus allowing the said finger-bar to pass beneath the same.

Figures 18, 19, 20, 21, 22, 23:
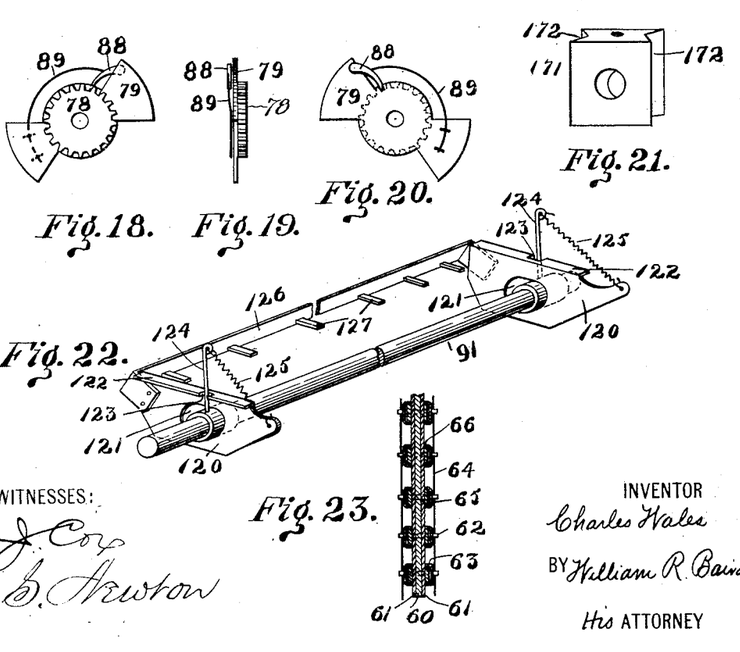

The shaft 91 is journaled in bearing-blocks 171, Figs. 7 and 21, fitted into the upper part of the side frames and held in position by vertical V-shaped grooves 172, receiving complemental edges 173 of apertures 174 in the frames. The blocks are adjusted by means of screws 175 in caps 176, which close the apertures.

Figure 25:
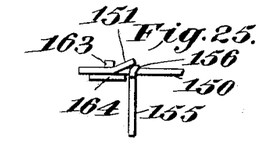
Fig. 25 is a detail view of most of the parts of Fig. 24 in elevation.
Figure 26:
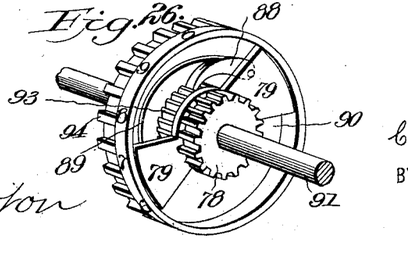

The pins 97 also serve to set in operation the carrying mechanism, which acts to move each wheel one step or number when the next wheel to the right passes the numeral "9." A trigger 130, Fig. 2, with a beveled head 131 is located adjacent to each numeral-wheel and secured at its lower end to a sleeve 133 on the bar 37 and held in its rearward position by a spring 160, secured at its other end to a transverse bar 48. In a notch 132 of the trigger 130 the forward end of a small connecting-lever 135, pivoted on the bar 40, is held, and to the opposite end of this lever is connected a jack 140. A tension-spring 142 is secured to a central rearward projection 144 on this jack and is also secured at its upper end to the bar 36, which is raised intermediate its ends above the frame of the machine. The purpose of this spring 142 is to lift the jack and throw forward its upper end, formed as a cog-tooth 141, Fig. 2, whereby the said cog-tooth will engage the teeth 94 on the numeral-wheel 90 and at the same time cause by its upward action the rotation of said wheel. Sleeves 134 on the bar 37 separate the endmost sleeves 133 from the side frames. As the numeral-wheel rotates it reaches a point where the "9" mark passes the rule 165, which is half a revolution, and the pin 97 strikes the beveled surface of the trigger-head 131 and throws the trigger forward, thus releasing the end of the connecting-lever 135 and causing the same to bear upon the upper edge of a laterally-sliding bar 155. This movement takes place as the main crank 50 and its arm 51 are drawn forward. The sliding bar 155 is supported at its ends on the arms 30 of the side frames and has mortises 157, Fig. 6, one for each lever 135, in its upper edge, and a lug 156 at one end adapted to engage the head 151 of arm 150 to move the bar lengthwise to the left, Figs. 6, 24, and 25. The movement of the bar 155 in the opposite direction is caused by a spring 158, Fig. 2, which has one of its ends connected near the middle of the bar and the other of its ends connected to the arm 31. The movements of the bar 155 are checked at the proper point by steps 159 at each end and which abut against the arm 30. The lug 156 is bent slightly forward, and the head 151 projects on the left side of the arm 150 and is turned upwardly on its forward edge, so that it will pass over the lug in moving forward and drop down to the right near the end of said movement, its point always resting on bar 155. The arm is held down by a spring 170, connecting with the rod 58. The arm 150 is attached at its lower end to the crank-arm 51, so that it will move forward and backward with said crank-arm. The inclined surface of the outer end or head 151 in moving backward engages the lug 156, and thus forces the bar 155 to slide to the left, the arm 150 being supported laterally during this action by a pin 163 on a projection 164 of the side frame, Figs. 3 and 4 in full lines and Figs. 7 and 8 in dotted lines. When the bar 155 slides to the left, the recesses 157 are brought beneath the forward ends of the levers 135, and when one of these levers has been released from the notch 132 this action will trip the carrying-jack 140, which jumps upward when the lever end enters the recess 157, thus causing the cog 141 to engage with the teeth 94 of the numeral-wheel 90, and thereby moves the said wheel one step. This action, as will be seen, takes place with the backward movement of the main crank. As the crank 50 and the arm 51 move farther backward a rod 149, Fig. 8, secured to the latter, will rotate the bar 39 by means of an arm 147, fixed thereto, and cause a depressing-bar 146 on arms 145 to bear down upon a rear extension 143 of the jack 140 and restore it to its former position, where it is then held by the engagement of the lever 135 with the trigger-notch 132 until the mechanism is again set in motion. The bar 146 rests normally in notches 148 in the extensions 143 provided therefor and moves up and down with each oscillation of the crank 50, restoring to position in its downward movement any of the jacks which may have been in operation. When the jack has been depressed to the proper position, the depressing motion is checked by a bent pin 168 on the connecting-lever 135, which is brought into contact with the forward edge of the jack near the point of its connection with said lever 135.

The operation of the machine is as follows: We will assume, for example, that the number first desired to be registered is "1902." As this is a number expressed in four numerals, we begin to write it on the fourth row of keys from the right-hand side of the keyboard and strike the "1" key, which is at the foot of the row. The recording of "1" requires the least motion of the numeral-wheel, and therefore the stop-bar on the end of the "1" key-lever is the one nearest the forward end of the rack-bar. We next strike the "9" key at the head of the third row of keys. Then as the next figure to be registered is a cipher, which requires no movement of the wheel, we pass the second row of keys and strike "2" in the first row. The striking of each key and consequent raising or setting of its stop-bar raises the dog over the row in which the particular stop is located, so that when the rack-bars are released by pressing the arm and raising the release-plate the rack-bars opposite the stops which have been set will fly forward until they come into contact with said stops. The dogs over the rows in which no stop has been set will prevent the forward movement of their respective rack-bars when released by the raising of the plate. The forward movements of the several racks, brought forward as above stated, rotate the pinions and draw back the pawls over their respective ratchets the required distances, so that on their return movements they will rotate the numeral-wheels to the extent necessary to bring the desired number up to the rule 165, which is the reading position for the number. The main operating-crank is next drawn forward, and the racks are forced to their rearward positions again, this movement rotating the wheels the desired distance in each instance through the medium of the pawls and ratchets. When the rack-bars return to their positions, the release-plate immediately engages them and holds them, the tension-spring 85 causing a constant pressure of the plate upon them. With the forward motion of the main crank the key-resetting plate is depressed by the rod 86, and the dogs, stops, and keys are thus returned to their original positions, and the machine is ready for the next operation.

If it is desired to double the number that has been registered, the multiplying-key is depressed before the main crank starts on its backward movement, and the crank movement repeated. In this latter instance the number to be registered is "3804" and as the stop in the fourth row is set to move the wheel one space the number registered on the forward movement of the crank is "2804;" but the forward movement of the third wheel has carried it beyond "9" and the pin on the third wheel has pressed the trigger of the carrying mechanism for the fourth wheel. When, therefore, the crank is drawn back, it will cause the sliding bar 155 to trip this mechanism and move the fourth wheel one step or number, thus raising the "2" on the fourth wheel to "3" and finally registering the proper number—"3804." For convenience the numeral-wheels have been provided with two sets of numbers from "0" to "9," but it is obvious that this is not essential, as one set of said numerals for each wheel could be used.

Let us now assume that it is desired to add the number "7654" to the "3804" already registered. The "7" key in the fourth row is first struck, then the "6" key in the third row, the "5" key in the second row, and the "4" key in the first row, as already explained. The main crank being now drawn forward, the numeral-wheels are rotated seven, six, five, and four steps, respectively, thus displaying on the register the numbers "0458." It will be seen that the two wheels to the left have passed the "9" mark. Therefore the third wheel on the backward movement of the crank is advanced by the carrying mechanism one step or number, thus raising it from "0" to "1," and the fifth wheel is advanced likewise to "1," thus recording the true sum—"11458."

What I claim is—

1. The combination of numeral-wheels, pinions connected therewith, rocking arms, racks supported on said arms and engaging the pinions, keys, and stops operated by the keys to control the movement of the racks in one direction.

2. The combination of numeral-wheels, pinions connected therewith, rocking arms pivoted at their lower ends, racks mounted on the upper ends of said arms and having teeth arranged in arcs of circles to constantly engage said pinions, keys, and stops operated by the keys to control the rearward movement of the racks.

3. The combination of keys, stops operatively connected to said keys, racks, and means for impelling the same in the direction of said stops, a single release-plate holding all of said racks out of operative position, numeral-wheels, and means for causing rotation of the same through the movement of said racks in one direction.

4. The combination of a removable keyboard, keys operative therein, levers directly connected to the keys and pivotally supported from the keyboard, and stops directly connected to and supported by the levers, with numeral-wheels and racks for operating the wheels and limited in their movement in one direction by the stops, the keyboard, keys, levers and stops being removable from the machine without disturbing the other mechanism.

5. The combination in an adding-machine of numeral-wheels, means for rotating them, means for returning the wheels to zero, correcting mechanism and repeating or multiplying mechanism, with a removable keyboard, keys, operative therein, key-levers connected thereto, and stops supported by the key-levers for governing the extent of movement of the wheel-operating means, the keyboard, keys, levers and stops being removable from the machine without disturbing the other mechanism.

6. The combination of a keyboard, a plurality of sets of keys, comprising key-rods, key-levers, and stop-rods connected to the inner ends of said levers, a bracket depending from the keyboard for each set, a plate depending from each bracket, a bracket secured under the keyboard at each side thereof, and a perforated guide-plate for the stop-rods supported by the side brackets.

7. The combination with a removable keyboard, of brackets on the under side thereof, plates depending from said brackets, levers pivoted intermediate their ends to said plates, keys above the keyboard, key-rods supporting the keys passing through the keyboard and connected to said levers, and stops supported upon the inner ends of said levers, the whole being removable from the machine without disturbing any of the mechanism.

8. The combination of keys, levers directly connected thereto, stops directly connected with said levers and friction devices for automatically holding the said levers in all positions into which they are moved by the keys.

9. The combination of a keyboard, brackets on the inner side thereof, plates depending from the brackets, key-levers pivoted to said plates, elastic strips between the plates and key-levers, and spring-pieces bent to embrace the key-levers and having pointed ends in contact with the elastic strips.

10. The combination of wheels having numerals thereon, means for rotating said wheels, keys for determining the extent of such rotation, a crank-arm, a bar connected with said crank-arm, pivoted arms normally out of the path of the said bar, stops by the operating of which each of said arms may be placed in the path of the bar, and a connection between said arms and the wheels whereby the motion of the crank-arm and bar imparts motion to the same, when interposed into the path of the bar, and rotates said wheels.

11. The combination of register-wheels, pinions imparting motion to said wheels when moved in one direction, racks continuously engaging said pinions, stops having movement in and out of the path of said racks, friction means for holding the stops in their different positions, levers connected to said racks, a cross-bar located outside the normal position of the levers, an operating-crank and a connection between said crank and bar whereby the said bar is operated against the rear of said levers.

12. The combination of register-wheels, a crank for rotating the same, intermediate mechanism comprising pinions communicating with said wheels, racks continuously engaging said pinions, a stop adapted to limit the movement of each rack, keys positively actuating said stops, frictional means for holding the stops in position and a dog normally in the path of each rack and adapted to be displaced by the movement of a stop into the path of the rack.

13. The combination of register-wheels, racks for rotating the same, a rocking plate engaging said racks and an arm on said plate whereby it may be removed from engagement with the racks, dogs in the path of said racks and stops adapted to displace said dogs when moved into the path of the racks and means for causing said plate to return the dogs and stops to normal position.

14. The combination of register-wheels, means for rotating the same, stops for determining the extent of such rotation, keys for operating said stops and levers connecting said keys and stops, plates to which a plurality of said levers are pivoted, and friction-springs bearing upon said plates and moving with the levers.

Witness my hand this 28th day of August, 1902, at the city of Port Huron, in the county of St. Clair and State of Michigan.

CHARLES WALES.

Witnesses:
PETER J. ABT,
WM. L. JANUARY.